United States Patent [19]

Kadri et al.

[11] 4,172,073

[45] Oct. 23, 1979

[54] METHOD FOR THE PREPARATION OF WATER-SOLUBLE KERATINACEOUS PROTEIN USING SATURATED STEAM AND WATER

[75] Inventors: Shakeel H. Kadri, Hanover, Pa.; William M. Allen, Louisville, Ky.; John H. Pikel, Oak Lawn, Ill.

[73] Assignee: Chemetron Corporation, Chicago, Ill.

[21] Appl. No.: 894,666

[22] Filed: Apr. 10, 1978

Related U.S. Application Data

[63] Continuation-in-part of Ser. No. 740,276, Apr. 9, 1976, abandoned.

[51] Int. Cl.$^2$ .............................................. A23J 1/10
[52] U.S. Cl. ................................ 260/123.7; 426/657
[58] Field of Search ...................................... 260/123.7

[56] References Cited

U.S. PATENT DOCUMENTS

| | | | |
|---|---|---|---|
| 2,158,499 | 5/1939 | Grassmann et al. | 260/123.7 |
| 2,170,562 | 8/1939 | Jurale | 426/807 |
| 2,597,566 | 5/1952 | Chiego | 426/807 X |
| 2,702,245 | 2/1955 | Mayer | 426/807 X |
| 2,865,905 | 12/1958 | Teale | 260/123.7 |
| 2,993,794 | 7/1961 | Moshy | 260/123.7 |
| 3,033,755 | 5/1962 | Jacobi | 260/123.7 X |
| 3,194,737 | 7/1965 | Jacobi | 260/123.7 X |
| 3,617,313 | 11/1971 | Harrington et al. | 204/15 X |
| 3,787,337 | 1/1974 | Goodwin | 260/123.7 X |
| 3,806,501 | 4/1974 | Rymer | 260/123.7 |

FOREIGN PATENT DOCUMENTS 1030515 of 1966 United Kingdom .

OTHER PUBLICATIONS

Zahn et al., pp. 62–64, International Wool Textile Research Conference, Proceedings, Australia 1955.
Bradbury, pp. 151–152, Advances in Protein Chemistry, vol. 27 (1973).

*Primary Examiner*—Howard E. Schain
*Attorney, Agent, or Firm*—Vincent G. Gioia; John K. Williamson

[57] ABSTRACT

A substantially completely water-soluble and pepsin-digestible protein is obtained by the hydrolysis of the keratin contained in animal structures with saturated steam at a pressure of from about 50 to about 250 p.s.i.g. or higher and from about 5 to about 30 parts of liquid water per part of the keratin source, by weight, at the temperature of saturated steam at the pressure employed. Conversion of the keratin to soluble protein and meal is about 80%; the yield of water-soluble protein being as high as about 70%. The water-soluble protein is an excellent animal food.

10 Claims, No Drawings

METHOD FOR THE PREPARATION OF WATER-SOLUBLE KERATINACEOUS PROTEIN USING SATURATED STEAM AND WATER

RELATED APPLICATION

This application is a continuation-in-part of co-pending application Ser. No. 740,276, filed Nov. 9, 1976, now abandoned.

BACKGROUND OF THE INVENTION

This invention relates to a water-soluble and edible protein derived from keratin and to a process for preparing said protein from sources of keratin such as animal hair, fur, feather, wool, hooves, horns, claws, shells, nails and keratinous materials such as meals prepared from them.

While solutions of proteins have been prepared from such sources in the past, the protein has usually been so degraded or contaminated that it has been unsatisfactory for use as a food and for many other uses.

A keratin is a hard, insoluble, fibrous protein, the amino acid content and sequence of which may vary slightly depending upon the animal structure in which it occurs. The keratins are distinguished from other structural proteins such as silk, fibrin, collagen and muscle proteins by their amino acid composition and particularly by the large number of cystine units in the keratin molecule. The hardness and insolubility of keratins is attributed to the intermolecular cross-linking of the peptide chains by these cystine units. It is apparent that a soluble protein derived from a keratin can no longer be called a keratin so, for want of a better name, the water-soluble, edible, substantially odorless, free-flowing, cream-colored flour obtained from the process of this invention is called herein a keratinaceous protein.

Prior to the discovery of the invention disclosed and claimed herein, there has not been, to the applicants' knowledge, a practical method for preparing from such sources a keratinaceous protein which is substantially non-degraded and which is substantially completely water-soluble and digestible by animals. While the preparation of feather meal and horn meal has been known for many years, these products are substantially insoluble in water. Methods for preparing such meals are taught in U.S. Pat. Nos. 2,170,562; 2,702,245; 3,464,342 and 3,617,313. It has been generally accepted that the hydrolysis of keratin to produce a water-soluble protein is feasible only when catalyzed by an acid, a base or some special chemical agent.

The patent literature teaches many variations of such hydrolytic procedures and it may be represented fairly by U.S. Pat. Nos. 926,999; 2,137,365; 2,158,499; 2,474,339; 2,597,566; 3,464,825; and 3,806,501.

The cooking of animal fats, meat scrap, offal and slaughter house wastes with steam at from 50 to 120 p.s.i.g. for from 10 to 30 minutes is taught as a rendering process for the recovery of tallow and a high protein meal in U.S. Pat. Nos. 3,263,592 and 3,295,982. An aqueous protein referred to as stickwater in these patents is a by-product of said rendering process. It is not clear from the teachings in these patents whether this aqueous protein is a suspension or a solution, nor is it clear whence said protein came. The histones present in the animal tissue and the blood proteins are the more apparent sources.

It has been noted by R. Renner et al at page 582, Volume 32 of Poultry Science that the addition to soybean meal of up to an equal weight of water partially prevents the loss of nutritive value of the meal caused by excessive heating during processing. It has remained for the applicants to discover, however, that the non-catalyzed hydrolysis of keratins in the presence of a large amount of liquid water gives high yields of a soluble protein.

SUMMARY OF THE INVENTION

Thus, it is an object of this invention to provide a keratinaceous protein that is substantially completely water-soluble.

It is another object of this invention to provide a keratinaceous protein that is substantially wholly digestible by pepsin.

It is another object of this invention to provide a substantially non-degraded keratinaceous protein that is free of alien acids and bases or other chemical additives.

It is yet another object of this invention to provide a substantially odorless keratinaceous protein which is suitable for use as a food for animals and humans.

It is a further object of this invention to provide a noval method for the hydrolysis of a keratin or keratinous material to yield said protein.

It is a still further object of this invention to provide a novel method for the preparation of a soluble protein by the hydrolysis of a keratin or keratinous material without the use of an acid, a base or any other catalyst.

DESCRIPTION OF THE INVENTION

These and other objects which will become apparent from the following disclosure are achieved by the conversion of keratin to a substantially completely water-soluble protein by hydrolysis with saturated steam at a pressure of from about 50 to about 250 p.s.i.g. or higher and from about 5 to about 30 parts of liquid water per part of the keratin source, by weight, at the temperature of saturated steam at the pressure employed. It will be appreciated by those skilled in the art that the temperature must be below the decomposition temperature of the desired keratinaceous protein.

The keratin source in the method of this invention is animal hair, fur, feathers, wool, hooves, horns, claws, shells, nails, other keratin-containing animal structures, meals prepared from said structures and mixtures of said structures and/or meals.

In the case of feathers, hair, fur and other structures, the ratio of liquid water to keratin source is from about 6.5:1 to about 30:1. The ratio may be as low as about 5:1 when meals are the keratin source.

The pressure usually employed is within the range of from about 95 to about 250 p.s.i.g. but it is preferably from about 125 to about 200 p.s.i.g. An especially preferred pressure is about 155 p.s.i.g. Pressures lower than about 50 p.s.i.g. may be employed but the yield of soluble protein is lessened to an uneconomical level.

The amount of saturated steam employed is usually generated from about 1.5 pounds of water per part of keratin source and the ratio of total weight of water to keratin source will be from about 6.5 to about 30:1. A higher ratio may be used but little advantage is gained thereby. The preferred weight ratio of total water to keratin source is from about 10:1 to about 25:1 but a more preferred ratio is from about 15:1 to about 20:1. A ratio of about 20:1 is especially preferred.

The heat transfer capacity of water minimizes the occurrence of localized over-heating of the keratin source and, thus, the use of liquid water is essential to the success of the method. The water, along with the high pressure, also aids in the disintegration of the keratin source so that its surface area is maximized. To this end, the reaction mixture is vigorously agitated by means of rotating blades, an auger, or the like.

Only the yield of the water-soluble protein is affected by the length of time during which the hydrolysis is conducted. The reaction time is usually from about 10 minutes to about 30 minutes but may be longer. More often the time is from about 15 minutes to about 25 minutes; the preferred time is about 20 minutes.

Yields of water-soluble keratinaceous protein as high as about 70% are obtained by this method. A high protein meal is also obtained and the total yield of soluble and insoluble protein is usually about 80%.

The water-soluble keratinaceous protein obtained in accordance with the present invention is characterized by its purity. The calculated percentage of protein in the dry product, using the factor 6.25 to convert the Kjeldahl nitrogen value to percent protein, is close to 100% after adjusting for the non-protein nitrogen in the product. The fat content is on the order of 0 to 2% while the fiber and carbohydrate contents are both on the order of 0 to 0.5%. Essentially no ash remains after combustion of the protein.

The soluble keratinaceous protein of this invention is essentially free of water-insoluble protein as shown by the Nitrogen Solubility Index (NSI) which ranges from 90 to 98. Very little precipitation is observed when the pH of a saturated solution of the protein is gradually lowered from 7 to 2 or raised to a strongly alkaline value. From 98 to 100% of said protein is digestible by pepsin.

The hydrolysis is performed in a pressure device provided with raw material and water inlets, a means for agitating the reaction mixture, a means for heating the mixture, a product outlet and, optionally, a steam inlet. Generally, the keratin source, e.g. poultry feathers or hog hair, and water are placed in the pressure vessel, the vessel is closed, heating and agitation are commenced and the pressure is allowed to build up to the desired value. A small amount of $H_2S$ and $NH_3$ is split out of the keratin molecule but these gases remain in the pressure vessel until the hydrolysis is stopped. After about 10 to about 30 minutes at the selected pressure, the heating and agitation are stopped and the product, in the form of a slurry, is discharged into a cyclone unit where the major portion of the gases is separated. The slurry contains the soluble protein and the insoluble meal and is filtered or centrifuged to remove the meal. The resulting liquid is dried by some suitable method such as passing it through a spray dryer to produce a light cream-colored flour. The meal is dried by some suitable method such as passing it through a countercurrent of hot air.

In some instances, only a portion, usually about one-half, of the total amount of water is placed in the pressure vessel initially and the remainder is added incrementally to help maintain the desired steam pressure. The full amount of water is usually present in the vessel during the last half of the hydrolysis period. A suitable pump is employed to inject the water into the pressurized vessel.

The conditions during a number of preparations of the soluble keratinaceous protein and the yields of said protein and the by-product meal are given in Table I. The ratio of total water to keratin source is indicated as WR. The percent yield is calculated from the cumulative yield of several runs, the number of which is shown in parentheses after the Example number. The analysis of the products of several of these Examples is given in Table II.

TABLE I

| Example No. | Keratin Source | Pressure (p.s.i.g.) | WR | Time (Minutes) | Yield (%) Meal (5% moisture) | Soluble Keratinaceous Protein (5% Moisture) |
| --- | --- | --- | --- | --- | --- | --- |
| 1 (14 runs) | Chicken feathers (dried to ambient humidity) | 125 | 20:1 | 20 | 33.6 | 50.4 |
| 2 (16 runs) | " | 155 | 20:1 | 20 | 23.5 | 60.5 |
| 3 (19 runs) | Chicken feathers (dried to ambient humidity) | 185 | 20:1 | 20 | 16.8 | 67.3 |
| 4 (13 runs) | " | 225 | 20:1 | 20 | 12.6 | 71.5 |
| 5 (8 runs) | Chicken feathers (dried to ambient humidity) | 125 | 10:1 | 20 | 42.0 | 42.0 |
| 6 (8 runs) | " | 95 | 20:1 | 20 | 46.0 | 37.5 |
| 7 (8 runs) | Chicken feathers dried to ambient humidity) | 125 | 20:1 | 30 | 30.25 | 51.0 |
| 8 (8 runs) | Hog Hair (dried to ambient humidity) | 95 | 20:1 | 20 | 42.5 | 42.0 |
| 9 (8 runs) | " | 125 | 20:1 | 20 | 21.0 | 63.0 |

TABLE II

| Product of Example No. | Fat % | Protein* (moisture free) % | Fiber % | Ash % | Carbohydrate % | Pepsin Digestible % | NSI |
| --- | --- | --- | --- | --- | --- | --- | --- |
| 1 | 0.66 | 97.1 | 0.0 | 0.0 | 0.0 | 99.85 | 93.97 |
| 2 | 1.38 | 100.8** | 0.0 | 0.0 | 0.0 | 99.74 | 97.32 |
| 3 | 1.79 | 98.7 | 0.5 | 0.0 | 0.0 | 99.91 | 95.41 |
| 4 | 0.95 | 98.9 | 0.5 | 0.0 | 0.0 | 99.85 | 94.29 |
| 6 | 1.44 | 103.9** | 0.4 | 0.0 | 0.4 | 99.17 | 91.71 |

TABLE II-continued

| Product of Example No. | Fat % | Protein* (moisture free) % | Fiber % | Ash % | Carbohydrate % | Pepsin Digestible % | NSI |
|---|---|---|---|---|---|---|---|
| 8 | 1.48 | 106.3** | 0.2 | 0.0 | 0.28 | 99.70 | 71.24 |

*(Total Kjeldahl N - non-protein N) × 6.25
**Values greater than 100% are caused by the use of 6.25 as the conversion factor, which is an arbitrary figure used in the meal industry and for proteins in general. All of the values above are deemed to be valid approximations of the protein content in the products, however.

The water-soluble keratinaceous protein prepared by the method of this invention is useful as a foodstuff either by itself or as an additive in other foodstuffs including cereal flours, soybean flour, meats, animal feed, candy, soft drinks, fruit drinks and the like. The nutritive value of foods for human or animal consumption is enhanced by the addition thereto of the soluble protein which contains all of the essential amino acids as shown in Table III. The foodstuff provided by this invention is especially useful because it is essentially free of water-insoluble protein such as that contained in keratinous meals and is substantially completely digestible by the pepsin in the digestive tract of humans and animals.

TABLE III

Weight Percent of Amino Acid in Water Soluble Keratinaceous Protein*

| Amino Acid | Product of Example No. | | | | |
|---|---|---|---|---|---|
| | 1 | 2 | 3 | 4 | 8 |
| Lysine | 1.34 | 2.14 | 2.39 | 1.40 | 5.28 |
| Histidine | 0.14 | 0.73 | 0.88 | 0.57 | 1.16 |
| Arginine | 7.22 | 5.15 | 6.85 | 7.11 | 8.54 |
| Aspartic acid | 6.81 | 5.42 | 3.49 | 2.80 | 8.62 |
| Threonine | 5.44 | 4.33 | 4.26 | 3.25 | 5.40 |
| Serine | 11.88 | 10.58 | 10.47 | 8.62 | 6.94 |
| Glutamic acid | 13.11 | 13.88 | 13.59 | 14.70 | 21.90 |
| Proline | 11.74 | 10.42 | 12.18 | 11.95 | 4.97 |
| Glycine | 10.60 | 11.49 | 12.96 | 12.75 | 7.96 |
| Alanine | 6.26 | 7.93 | 8.14 | 8.70 | 6.25 |
| Cystine | 0.47 | 0.54 | 0.33 | 0.21 | 0.82 |
| Valine | 8.42 | 7.77 | 8.32 | 9.29 | 5.30 |
| Methionine | 0.34 | 0.58 | 0.47 | 0.49 | 0.87 |
| Isoleucine | 6.01 | 5.58 | 5.10 | 4.85 | 3.52 |
| Leucine | 9.08 | 8.16 | 7.92 | 9.29 | 8.19 |
| Tyrosine | 1.10 | 2.92 | 1.05 | 1.78 | 1.54 |
| Phenylalanine | 0.84 | 2.00 | 0.73 | 1.50 | 2.28 |
| Tryptophane | 0.25 | 0.38 | 0.54 | 0.58 | 0.26 |

*Based on sample as 100% protein

The embodiments of the invention illustrated and described herein are merely illustrative and variations which may differ in detail but not in substance will readily suggest themselves to those skilled in protein chemistry. The scope of this invention is not intended to be defined by the illustrative embodiments but the subject matter which the applicants regard as their invention is particularly set forth in the following claims.

Having thus described our invention, what we claim is:

1. A method for the preparation of water-soluble keratinaceous protein which comprises hydrolyzing keratin in a medium consisting of saturated steam at a pressure of from about 50 to about 250 p.s.i.g. or higher and from about 5 to about 30 parts of liquid water per part of the keratin source, by weight, at the temperature of saturated steam at the pressure employed in the absence of alien acids and bases or other chemical additives.

2. The method of claim 1 wherein the pressure is from about 95 to about 250 p.s.i.g.

3. The method of claim 1 wherein the ratio of the total amount of water, as steam and as liquid, to the keratin source is from about 8:1 to about 30:1.

4. The method of claim 1 wherein the ratio is from about 6.5 to about 25:1.

5. The method of claim 1 wherein the pressure is from about 125 to about 200 p.s.i.g.

6. The method of claim 3 wherein the ratio is from about 15:1 to about 20:1.

7. The method of claim 6 wherein the pressure is from about 125 to about 200 p.s.i.g.

8. The method of claim 4 wherein the keratin source is poultry feathers.

9. The method of claim 1 wherein the keratin source is feathermeal.

10. The method of claim 3 wherein the keratin source is selected from the group consisting of poultry feathers, hog hair or a mixture of them, the pressure is 155 p.s.i.g. and the ratio is 20:1.

* * * * *